US009912719B2

(12) United States Patent
Madanes

(10) Patent No.: US 9,912,719 B2
(45) Date of Patent: *Mar. 6, 2018

(54) COMMERCE APPLICATIONS BETWEEN AN ON-LINE SERVICE AND A THIRD-PARTY

(71) Applicant: eBay Inc., San Jose, CA (US)

(72) Inventor: Rodrigo Madanes, London (GB)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,284

(22) Filed: Jan. 27, 2014

(65) Prior Publication Data

US 2014/0143319 A1 May 22, 2014

Related U.S. Application Data

(63) Continuation of application No. 13/113,768, filed on May 23, 2011, now Pat. No. 8,639,778.

(60) Provisional application No. 61/438,495, filed on Feb. 1, 2011.

(51) Int. Cl.
*H04L 29/08* (2006.01)
*G06F 9/54* (2006.01)
*G06Q 30/00* (2012.01)

(52) U.S. Cl.
CPC .............. *H04L 67/02* (2013.01); *G06F 9/54* (2013.01); *G06Q 30/00* (2013.01)

(58) Field of Classification Search
CPC ...... G06Q 30/0643; G06Q 30/00; G06F 9/54; H04L 67/02
USPC ........................................................ 709/203
See application file for complete search history.

(56) References Cited

U.S. PATENT DOCUMENTS

| 8,209,706 | B2 | 6/2012 | Corvera et al. |
| 8,250,145 | B2 | 8/2012 | Zuckerberg et al. |
| 8,306,858 | B2 | 11/2012 | Lisbakken |
| 8,407,576 | B1 | 3/2013 | Yin et al. |

(Continued)

OTHER PUBLICATIONS

"U.S. Appl. No. 13/113,768 , Response filed Apr. 15, 2013 to Non Final Office Action dated Nov. 13, 2012", 11 pgs.

(Continued)

*Primary Examiner* — Khaled Kassim
*Assistant Examiner* — Syed S Ali
(74) *Attorney, Agent, or Firm* — Schwegman Lundberg & Woessner, P.A.

(57) ABSTRACT

A system and method of presenting a commerce application to an electronic device of an end-user are disclosed. The method includes establishing electronic communications from the end-user to a first server (e.g., an electronic marketplace) in response to the end-user accessing an element presented by the first server, and establishing electronic communications between the first server and a second server. The second server may be, for example, another electronic marketplace. The first server sends a graphical interface feature to the end-user. Substantially concurrent with the first server sending the graphical interface feature, the second server transmits electronically graphical content to be placed within the graphical interface feature on a browser on an electronic device of the end-user. The blending of the graphical interface feature and the graphical content is transparent to the end user; thus, the end-user may be unaware that additional information is being received from the second server.

20 Claims, 11 Drawing Sheets

(56) References Cited

U.S. PATENT DOCUMENTS

| | | | |
|---|---|---|---|
| 8,639,778 B2 | 1/2014 | Madanes | |
| 2006/0229998 A1* | 10/2006 | Harrison | G06Q 20/02 705/78 |
| 2007/0200850 A1* | 8/2007 | Shah | G06F 17/30389 345/440 |
| 2008/0010148 A1* | 1/2008 | Knibiehly | G06Q 30/00 705/14.23 |
| 2008/0235042 A1* | 9/2008 | Boyd | G06Q 30/02 705/1.1 |
| 2009/0265252 A1* | 10/2009 | Fletcher | G06Q 30/04 705/26.1 |
| 2009/0328061 A1 | 12/2009 | Fujita et al. | |
| 2009/0328063 A1 | 12/2009 | Corvera et al. | |
| 2010/0017217 A1* | 1/2010 | Olliphant | G06Q 20/04 705/1.1 |
| 2010/0131530 A1* | 5/2010 | Gibson | G06F 17/3087 707/758 |
| 2010/0162126 A1 | 6/2010 | Donaldson et al. | |
| 2010/0281364 A1 | 11/2010 | Sidman | |
| 2011/0119069 A1* | 5/2011 | Szuppa | G06Q 10/06 705/1.1 |
| 2011/0137975 A1 | 6/2011 | Das et al. | |
| 2011/0153463 A1 | 6/2011 | Lovelace | |
| 2011/0321003 A1 | 12/2011 | Doig et al. | |
| 2012/0016749 A1 | 1/2012 | Lisbakken | |
| 2012/0054143 A1 | 3/2012 | Doig et al. | |
| 2012/0089481 A1 | 4/2012 | Iozzia et al. | |
| 2012/0095873 A1* | 4/2012 | Narang | G06Q 30/0613 705/26.41 |
| 2012/0095881 A1* | 4/2012 | Rothman | G06Q 30/0643 705/27.2 |
| 2012/0124192 A1* | 5/2012 | Daoud | G06Q 30/02 709/224 |
| 2012/0136756 A1 | 5/2012 | Jitkoff et al. | |
| 2012/0150644 A1 | 6/2012 | Shiely et al. | |
| 2012/0198029 A1* | 8/2012 | Madanes | G06F 9/54 709/219 |
| 2012/0198324 A1 | 8/2012 | Mahajan et al. | |
| 2012/0203847 A1 | 8/2012 | Kendall et al. | |
| 2012/0227073 A1* | 9/2012 | Hosein | H04N 21/4126 725/60 |
| 2012/0331376 A1 | 12/2012 | Gorokhovsky et al. | |
| 2013/0073979 A1 | 3/2013 | Shepherd et al. | |
| 2013/0074151 A1 | 3/2013 | Lin et al. | |
| 2013/0080242 A1 | 3/2013 | Alhadeff et al. | |
| 2017/0185975 A1* | 6/2017 | Harrison | G06Q 20/0855 |

OTHER PUBLICATIONS

"U.S. Appl. No. 13/113,768, Non Final Office Action dated Nov. 13, 2012", 14 pgs.

"U.S. Appl. No. 13/113,768, Notice of Allowance dated Sep. 19, 2013", 17 pgs.

"U.S. Appl. No. 13/113,768, Preliminary Amendment Filed May 23, 2011", 3 pgs.

* cited by examiner

COMMERCE APPLICATIONS BETWEEN AN ON-LINE SERVICE AND A THIRD-PARTY

CLAIM OF PRIORITY

This application is a continuation of and claims the benefit of priority under to U.S. patent application Ser. No. 13/113,768, filed on May 23, 2011, which claims the priority benefit of U.S. Provisional Application No. 61/438,495 filed Feb. 1, 2011 entitled, COMMERCE APPLICATIONS: DATA HANDSHAKE BETWEEN AN ON-LINE SERVICE AND A THIRD-PARTY PARTNER, the entire contents of which are incorporated herein by reference.

TECHNICAL FIELD

The present application relates generally to the field of computer technology and, in a specific exemplary embodiment, to a system and method of allowing an end-user to select fashion and accessories in an electronic marketplace.

BACKGROUND

Design and selection of fashion articles of clothing and related accessories can be a time consuming and sometimes daunting task. For example, clothing selection often involves traveling between various department stores and clothing shops, along with finding and trying on different articles of clothing at each location to determine aesthetic appearance. Accordingly, consumers are increasingly using on-line catalogs and other electronic marketing resources on the Internet for purchasing clothing and accessories. Although these on-line services offer convenience to consumers, the on-line services still are unable to provide guidance in terms of matching accessories to a given article of clothing or finding similar merchandise to match an outfit.

BRIEF DESCRIPTION OF DRAWINGS

Various ones of the appended drawings merely illustrate exemplary embodiments of the present invention and cannot be considered as limiting its scope.

DETAILED DESCRIPTION

Figure 1:
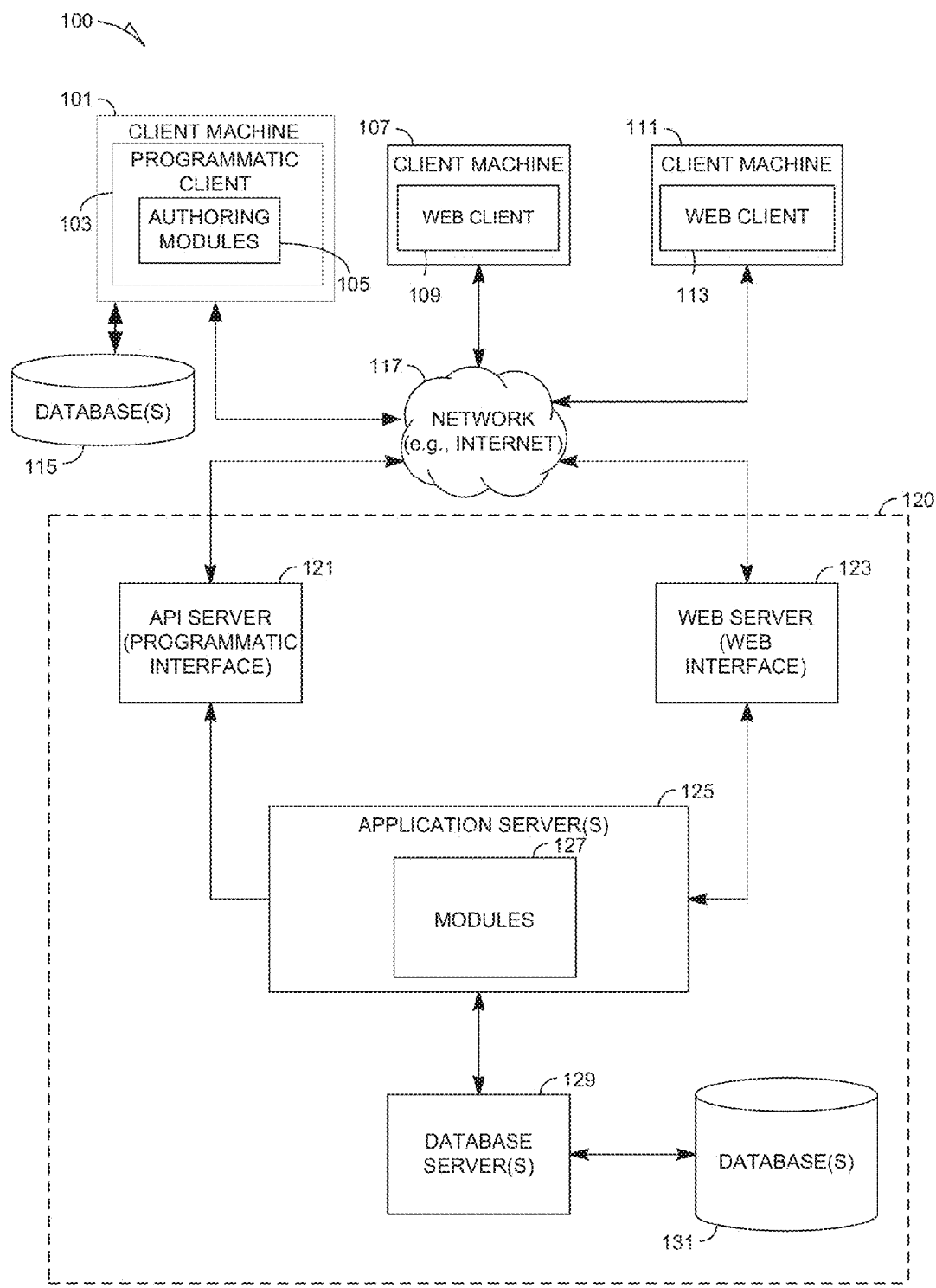
FIG. 1 is a block diagram illustrating an exemplary embodiment of a high-level client-server-based network architecture diagram depicting a system used to process end-user queries.

The description that follows includes illustrative systems, methods, techniques, instruction sequences, and computing machine program products that embody the present invention. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on social fashion (e.g., selection of clothing, shoes, and accessories) in an electronic retail environment, the embodiments are given merely for clarity in disclosure. Thus, any type of electronic commerce or electronic business system and method, including various system architectures, may employ various embodiments of the social fashion system and method described herein and is considered as being within a scope of the present invention.

In an exemplary embodiment, a method and related non-transitory computer readable storage medium for presenting a commerce application to an end-user is provided. The method includes establishing electronic communications from the end-user to a first server (e.g., an electronic marketplace) in response to the end-user accessing a widget presented by the first server. In response to the end-user accessing the widget, a first request is received by the first server to establish electronic communications between the first server and a second server. The second server may be another electronic marketplace. The first server sends a chrome, defined herein, to the end-user. Substantially concurrent with the first server sending a chrome, the second server electronically transmits an Iframe to be placed within the chrome on a browser on an electronic device of the end-user. The blending of the chrome and the Iframe is transparent to the end user; thus, the end-user may be unaware that additional information (e.g., in terms of the Iframe and any accompanying metadata) is being received from the second server.

In another exemplary embodiment, a network architecture to present a commerce application to an end-user is provided. The network architecture includes a first server, having one or more processors, to send a widget to an end-user. The first server receives a request from the end-user and establishes electronic communication to a second server in response to the end-user accessing the widget. The first server additionally transmits a chrome to the end-user and allows instructions to be transmitted to the second server to, in turn, transmit an Iframe to the end-user. Each of these exemplary embodiments, and others, is discussed in detail, below.

With reference to FIG. 1, a high-level network diagram of an embodiment of an exemplary system 100 with a client-server architecture includes a first client machine 101, a second client machine 107, a third client machine 111, a network 117 (e.g., the Internet), and an information storage and retrieval platform 120. In this embodiment, the information storage and retrieval platform 120 constitutes a commerce platform or commerce server and provides server-side functionality, via the network 117, to the first 101, second 107, and third 111 client machines. A programmatic client 103 in the form of authoring modules 105 executes on the first client machine 101. A first web client 109 (e.g., a browser, such as the Internet Explorer browser developed by Microsoft Corporation of Redmond, Wash.) executes on the second client machine 107. A second web client 113 executes on the third client machine 111. Additionally, the first client machine 101 is coupled to one or more databases 115.

Turning to the information storage and retrieval platform 120, an application program interface (API) server 121 and a web server 123 are coupled to, and provide programmatic and web interfaces respectively to, one or more application servers 125. The application servers 125 host one or more modules 127 (e.g., modules, applications, engines, etc.). The application servers 125 are, in turn, coupled to one or more database servers 129 facilitating access to one or more information storage databases 131. The one or more modules 127 provide a number of information storage and retrieval functions and services to users accessing the information storage and retrieval platform 120. The one or more modules 127 are discussed in more detail, below.

While the exemplary system 100 of FIG. 1 employs a client-server architecture, a skilled artisan will recognize that the present disclosure is not limited to such an architecture. The exemplary system 100 could equally well find application in, for example, a distributed, or peer-to-peer, architecture system. The one or more modules 127 and the authoring modules 105 may also be implemented as stand-alone software programs, which do not necessarily have networking capabilities.

The first 109 and second 113 web clients access the one or more modules 127 via the web interface supported by the web server 123. Similarly, the programmatic client 103 accesses the various services and functions provided by the one or more modules 127 via the programmatic interface provided by the API server 121. The programmatic client 103 is, for example, a seller application (e.g., the "Turbo Lister 2" application developed by eBay® Inc., of San Jose, Calif.) enabling sellers to author and manage data items or listings on the information storage and retrieval platform 120 in an off-line manner. Further, batch-mode communications can be performed between the programmatic client 103 and the information storage and retrieval platform 120. In addition, the programmatic client 103 can include, as previously indicated, the authoring modules 105 used to author, generate, analyze, and publish domain rules and aspect rules. The domain and aspect rules are used in the information storage and retrieval platform 120 to structure the data items and transform queries. Such domain and aspect rules are known independently in the art.

Figure 2:
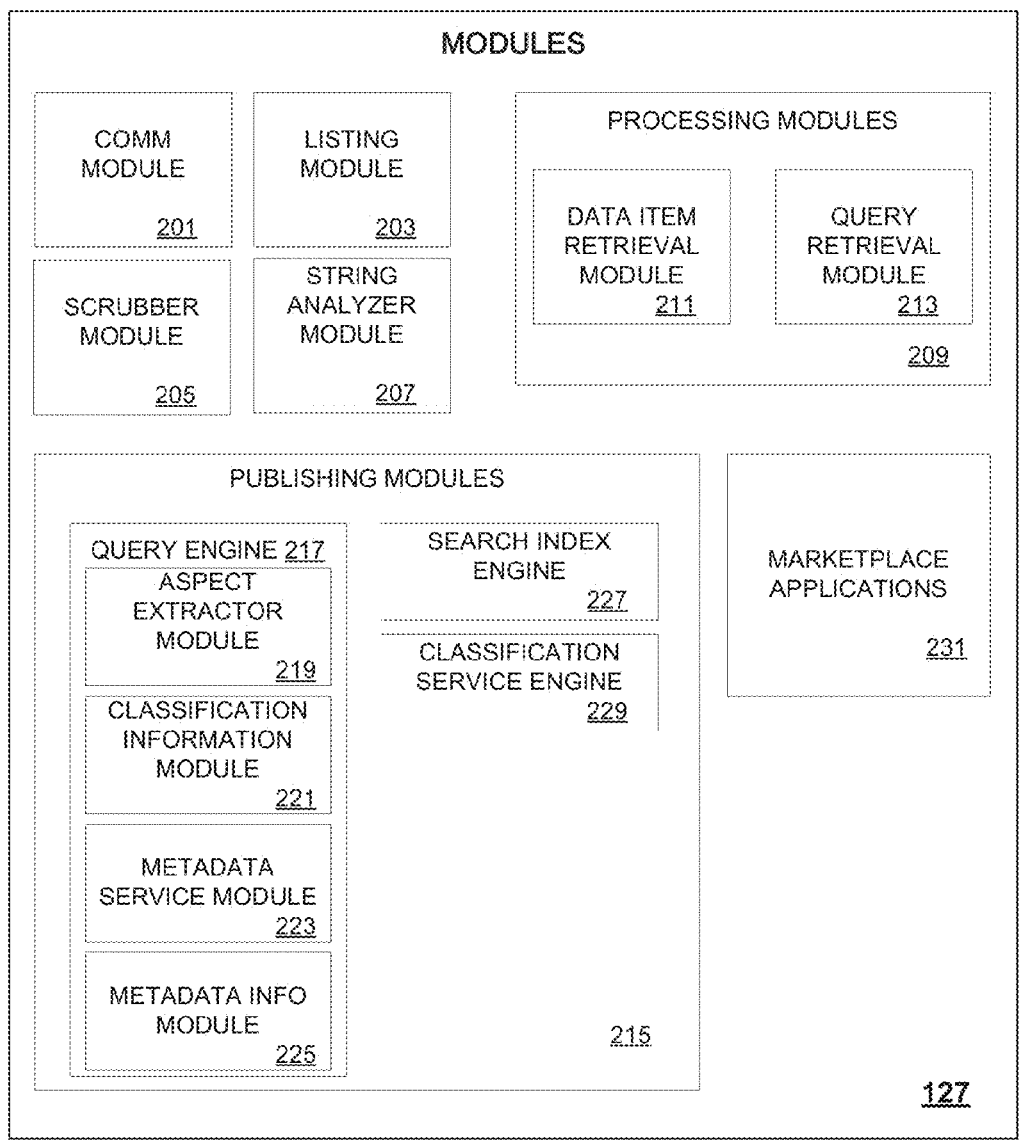
FIG. 2 is a block diagram illustrating an exemplary embodiment of various modules of the network architecture of FIG. 1.

Referring now to FIG. 2, an exemplary block diagram of the one or more modules 127 of FIG. 1 is shown to include a communication module 201, a listing module 203, a scrubber module 205, a string analyzer module 207, a plurality of processing modules 209, and a publishing module 215. The one or modules 127 further includes a marketplace application block 231.

The communication module 201 receives a query from one or more of the client machines 101, 107, 111 (see FIG. 1). The query includes one or more constraints (e.g., keywords, categories, or information specific to a type of data item). The communication module 201 interacts with a query engine 217 and a search index engine 227, both located in the publishing module 215, to process the query. In conjunction with the query engine 217 and the search index engine 227, the communication module 201 attempts to extract aspect-value pairs (e.g., brand="Donna Karan" or "DKNY") based on the query. Details of the aspect-value pairs are described in more detail, below.

The publishing module 215 publishes new or existing rules, as discussed above with reference to FIG. 1, to the information storage and retrieval platform 120, thereby enabling the rules to be operative (e.g., applying the rules to data items and queries). In a specific exemplary embodiment, the information storage and retrieval platform 120 of FIG. 1 may be embodied as a network-based marketplace that supports transactions of data items or listings (e.g., goods or services) between sellers and buyers. One such marketplace is eBay®, The World's Online Marketplace®, developed by eBay® Inc., of San Jose, Calif. In this embodiment, the information storage and retrieval platform 120 receives information from sellers describing the data items. The data items are subsequently retrieved by potential buyers or bidders. The one or more modules 127 include the marketplace application block 231 to provide a number of marketplace functions and services to end-users accessing the information storage and retrieval platform 120.

The publishing module 215 further includes a classification service engine 229. The classification service engine 229 applies domain rules to identify one or more domain-value pairs (e.g., product type=women's blouses) associated with the data item. The classification service engine 229 further applies the aspect rules to identify aspect-value pairs associated with the data item. The classification service engine 229 applies the domain and aspect rules to data items or listings as they are added to the information storage and retrieval platform 120 or responsive to the publication of new rules (e.g., domain rules or aspect rules). The scrubber module 205 utilizes services of the classification service engine 229 to structure the item information in the data item (e.g., the classification service engine 229 applies domain and aspect rules). The classification service engine 229 then pushes or publishes item search information over a bus (not shown but implicitly understood by a skilled artisan) in real time to the search index engine 227.

The search index engine 227 includes search indexes and data item search information (e.g., including data items and associated domain-value pairs and aspect-value pairs). The search index engine 227 receives the transformed query from the communication module 201 and utilizes the search indexes to identify data items based on the transformed query. The search index engine 227 communicates the found data items to the communication module 201.

A query retrieval module 213, within the plurality of processing modules 209, receives information from one or more of the client machines 101, 107, 111 and stores the information as a data item in the one or more information storage databases 131 (see FIG. 1). For example, an end-user, acting as a seller and operating on one of the client machines, enters descriptive information for the data item to be offered for sale or auction through the information storage and retrieval platform 120.

The plurality of processing modules 209 receives classification information and metadata information associated with the data item. The information is published to, for example, a local backend server (not shown) hosting the query engine 217, the search index engine 227, and the classification service engine 229.

The plurality of processing modules 209 further includes a data item retrieval module 211 to receive requests for data items from a client machine. For example, responsive to receiving a request, the data item retrieval module 211 reads data items from the data item information stored on the one or more information storage databases 131 (FIG. 1) and stores the data items as sample information in the one or more databases 115 for access by the client machine. Responsive to receiving the request, the query retrieval module 213 reads queries from the sample information and communicates the queries to the client machine.

The string analyzer module 207 receives requests from the first client machine 101 to identify candidate values to associate with an aspect. The request may include the aspect and one or more values that have been associated with the aspect. The string analyzer module 207 utilizes the aspect (e.g., "color") to identify strings of text in a database that includes the aspect. The string analyzer module 207 relies on various services provided in the information storage and retrieval platform 120 to identify and process the strings of text. For example, the string analyzer module 207 utilizes services that expand the aspect to a derivative form of the aspect including a singular form (e.g., "color"), a plural form (e.g., "colors"), a synonymous form, an alternate word form (e.g., "chroma," "coloring," or "tint"), a commonly misspelled form (e.g., "collor"), or an acronym form.

A database (not shown specifically) used by the string analyzer module 207 includes queries or data items that have been entered by a user (e.g., buyer or seller, respectively although a seller may wish to enter queries as well) to the information storage and retrieval platform 120. The database can also store or reference dictionaries, thesauruses, or other reference sources. The string analyzer module 207 analyzes the strings of text to identify candidate values to associate with the aspect. More examples of query strings and searching techniques are given, below.

The query engine 217 includes an aspect extractor module 219, a classification information module 221, a metadata service module 223, and a metadata information module 225. The aspect extractor module 219 receives a query from the communication module 201 and applies aspect rules to extract aspect-value pairs from the query. Further, the aspect extractor module 219 communicates the query received from the communication module 201 to the plurality of processing modules 209 that stores the query as sample query information.

The classification information module 221 includes phrases from a plurality of past searches to reference against the query. For example, synonyms or related information for a query can be stored in the classification information module 221 to aid a user in locating an item or a particular set of items.

The metadata service module 223 communicates descriptive metadata information to the communication module 201 based on a query received from the communication module 201. The metadata information is retrieved from the metadata information module 225 and includes metadata that the communication module 201 uses to format and generate a user interface to provide additional information to the user based on the original user-generated query.

Once aspect-value pairs, classification information, and other relevant information is retrieved through, for example, either the data item retrieval module 211 or the query retrieval module 213, the listing module 203 provides additional assistance to a user listing the data item. The additional assistance can be, for example, one or more interfaces for the user to upload photographs, textual descriptions, and bidding information.

Although the one or more modules have been defined in terms of a variety of individual modules and engines, a skilled artisan will recognize that many of the items can be combined or organized in other ways. The description given herein simply provides an exemplary embodiment to aid the reader in an understanding of the systems and methods used herein.

Figure 3:
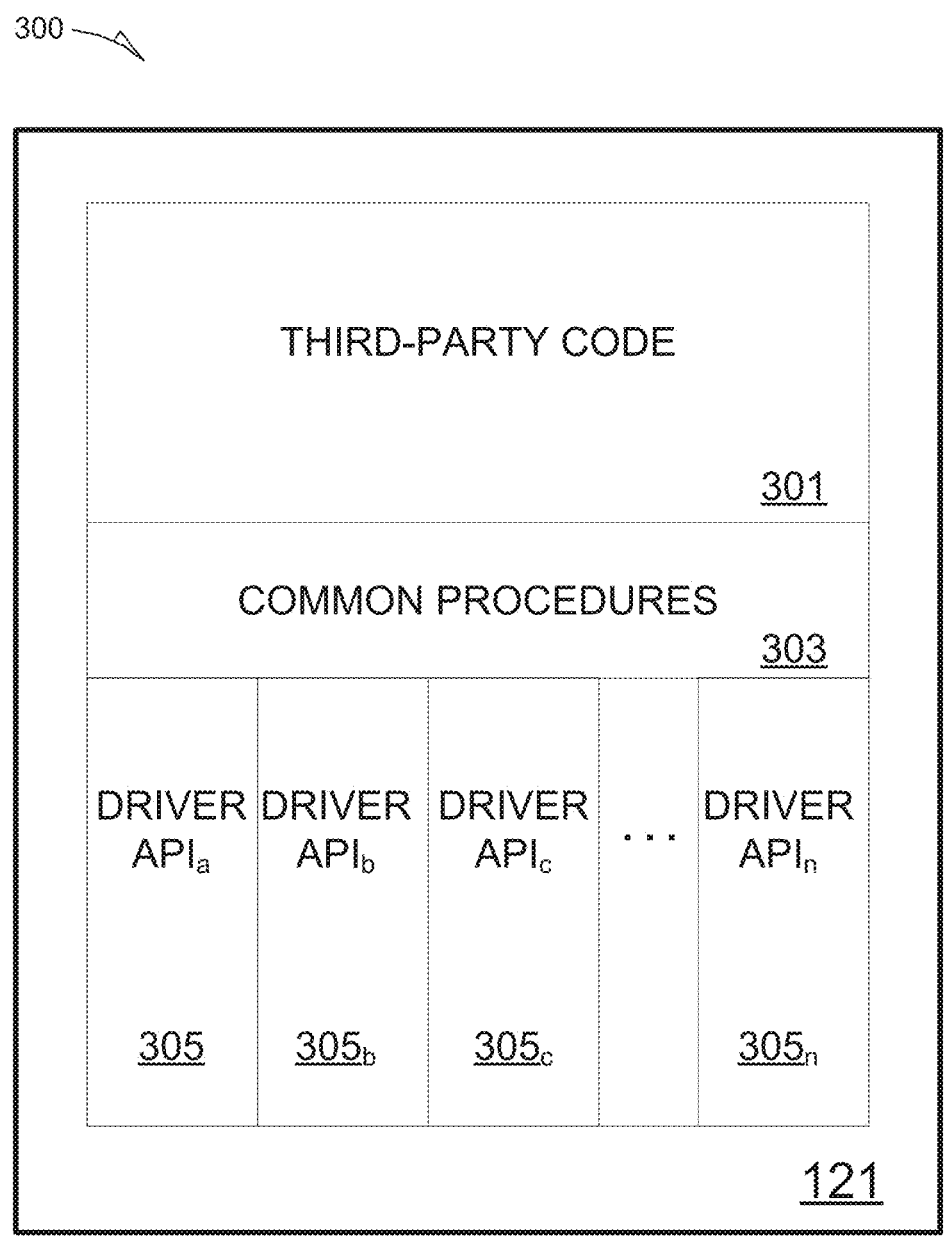
FIG. 3 is a block diagram of an exemplary interface configured to interface, in various embodiments, the network architecture with various external electronic retailers.

With reference now to FIG. 3, a detailed exemplary embodiment 300 of various components of the API server 121 of FIG. 1 is shown to include a third-party code section 301, a common procedures section 303, and a plurality of application program interface (API) driver sections $305_a$, $305_b$, . . . , $305_n$. The third-party code section 301 includes any software or hardware components, algorithms, etc. that may provide functionality with the information storage and retrieval platform 120 of FIG. 1. Thus, details of the third-party code section 301 may vary from one platform to another. However, details for interfacing any platform with software or hardware in general, and the API server 121 in particular, are known independently by one skilled in the art. Further, the third-party code section 301 may be considered an open solution and is thus directly open to extension by the various providers.

Additionally, the common procedures section 303 provides an interface from each of the plurality of application program interface driver sections 305. The common procedures section 303 may be considered as a software development kit (SDK) interface or a hardware interface (realizable using, for example, field-programmable gate arrays (FPGAs) or one or more processors configured by software to perform particular functions). SDKs and FPGAs are both known independently in the art and allow a programmer to create applications for enhancing operation of other software or hardware. Here, operation of each API driver in the plurality of application program interface driver sections 305 is enhanced through the common procedures section 303 to operate with the third-party code section 301 and consequently, with the information storage and retrieval platform 120 of FIG. 1. Details for the common procedures section 303 will vary depending upon details required by a provider and a particular API interfacing with the platform. However, the skills required to produce code within the common procedures section 303 are known independently in the art.

Each of the API drivers within the plurality of application program interface driver sections 305 is directly obtainable from a particular one of the plurality of electronic retailers, as described in more detail, below. For example, the API driver (e.g., $API_a$) associated with a first external electronic retailer is available directly from the first electronic retailer. Additionally, since the first electronic retailer is effectively acting as a host for the enhanced services provided to the end-user (e.g., the one or more of the client machines 101, 107, 111), $API_a$ will likely contain additional code to provide the enhanced services. The additional code may be, for example, routines to poll input and output streams from the remainder of the APIs, routines to poll input and output streams from the web client 109, and code to record such information.

Overview of Commerce Applications

Commerce applications allow advertisements from various third-party electronic retailers (e.g., business-to-consumer ("B2C") or business-to-business ("B2B")) to occur seamlessly to an end-user without sending an end-user from an initial electronic marketplace (e.g., such as eBay®, Inc.) to an external website of the third-party retailer (e.g., the websites of J. CREW® or WAL-MART®. The commerce applications are effected by a data handshake between the initial electronic marketplace and various partners (e.g., the third-party retailers). The third-party retailer benefits from a potentially new audience of end-users. However, the third-party retailer does not need to incur the substantial costs involved with being "on-core" (e.g., having to integrate all databases and protocols to be compatible with the host's website).

Benefits to the end-user include maintaining a "comfort level" for the end-user. The comfort level is at least partially achieved since the end-user stays on the initial website first visited with which he or she is presumably already familiar. Further, additional activities such as reviews and ratings of products, services, and impressions of the third-party are directly available to gauge experiences other end-users have had with the third-party. Payments for items purchased can also be made directly through the initial site through, for example PayPal® or a familiar capability to the end-user such as BUY IT NOW® (BIN). The end-user can also arrange to pick-up purchased items in a local store; the nearest location of which is already known based on the IP address of the end-user's computer or one or more cookies already stored on the end-user's computer by the initial website. Finally, the initial website benefits from being able to "follow" the end-user to other types of product selections, thus providing valuable marketing input to the initial website for future partnering opportunities with other third-parties.

Figure 4:
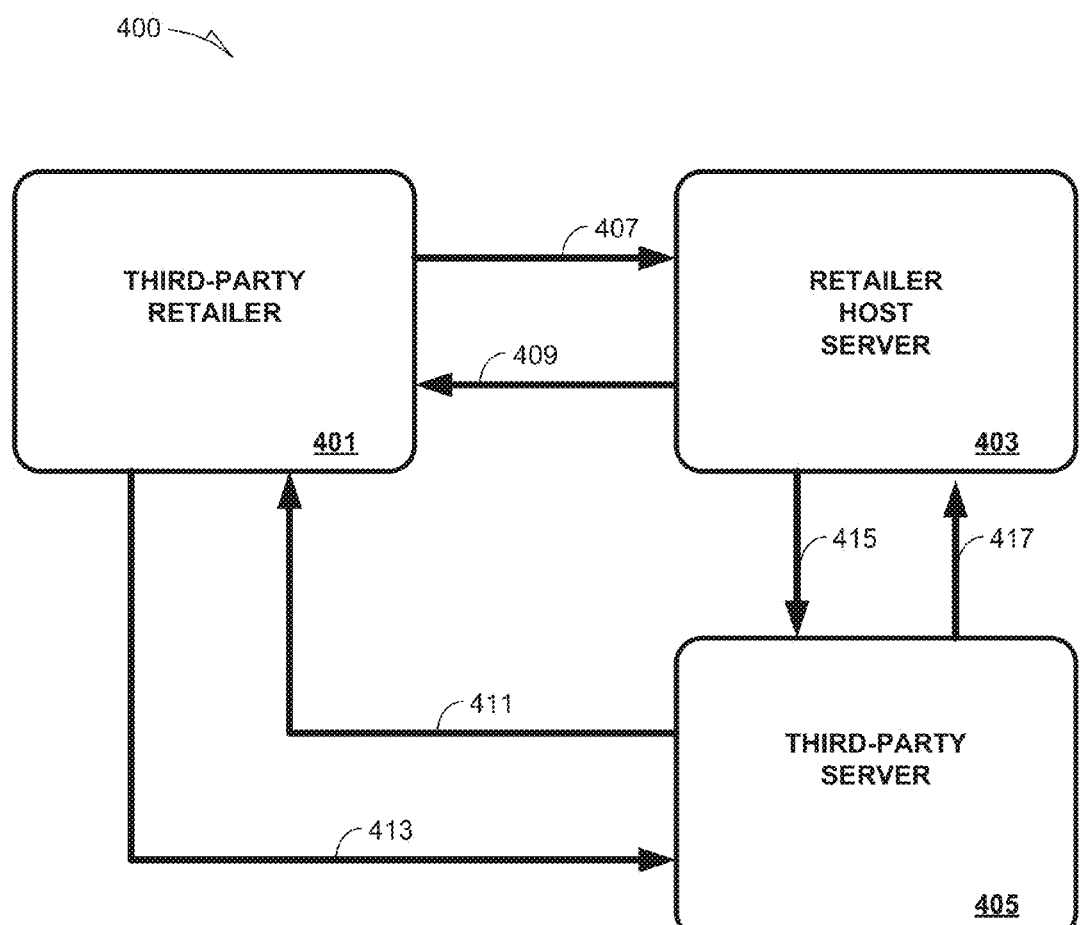
FIG. 4 is a block diagram of an exemplary process to establish a data handshake between a retailer host server and a third-party retailer.

With reference now to FIG. 4, a block diagram of an exemplary process 400 to establish a data handshake between a retailer host server 403 and a third-party retailer 401 is shown to include a third-party server 405 and a number of requests and responses. The requests and responses may be routed through various APIs, if and as-needed, to establish a handshake between the various servers. For example, an end-user visits the retailer host server 403 via a browser on the end-user's electronic device (e.g., a computer or smart phone). The end-user notices and clicks on a widget within the browser displayed by the retailer host server 403. By clicking on the widget, an initial request 409 is placed from the retailer host server 403 to a website of the third-party retailer 401. The third-party retailer 401 may place a data request 413 to the third-party server 405 to receive information contained in the initial request 409. The third-party server 405 prepares a response 411 to the data request 413. Since the site of the third-party retailer 401 and the third-party server 405 may be portions of, for example, the same server or the same enterprise structure, no APIs may be necessary for the two components to communicate.

Once the response 411 to the data request 413 is received by the third-party retailer 401, the third-party retailer 401 compiles the information and produces a response 407 in the form of an "Iframe." An Iframe is an element of HTML that supports an in-line tag allowing inclusion of external objects including other HTML documents. The Iframe is received by the retailer host server 403. The Iframe is displayed to the end-user surrounded by a chrome supplied by the retailer host server 403. The chrome is a type of graphical interface feature that provides a frame, or container, for presentation content contained within the Iframe. The chrome will typically have identifying indicia of the retailer host server 403. Therefore, since the Iframe from the third-party retailer 401 is contained within the chrome of the retailer host server 403, the end-user will typically be unaware that information has flowed from another website or server. In conjunction with, or in addition to, the retailer host server 403 requesting and receiving information from the third-party retailer 401, the retailer host server 403 may communicate directly with the third-party server 405 by sending a request 415 and receiving a response 417 from the third-party server 405. The request 415 may be made to the third-party server 405, for example, through a widget contained in the original Iframe received from the third-party retailer. Additional details of the chrome and Iframe are provided, below.

Figure 5:
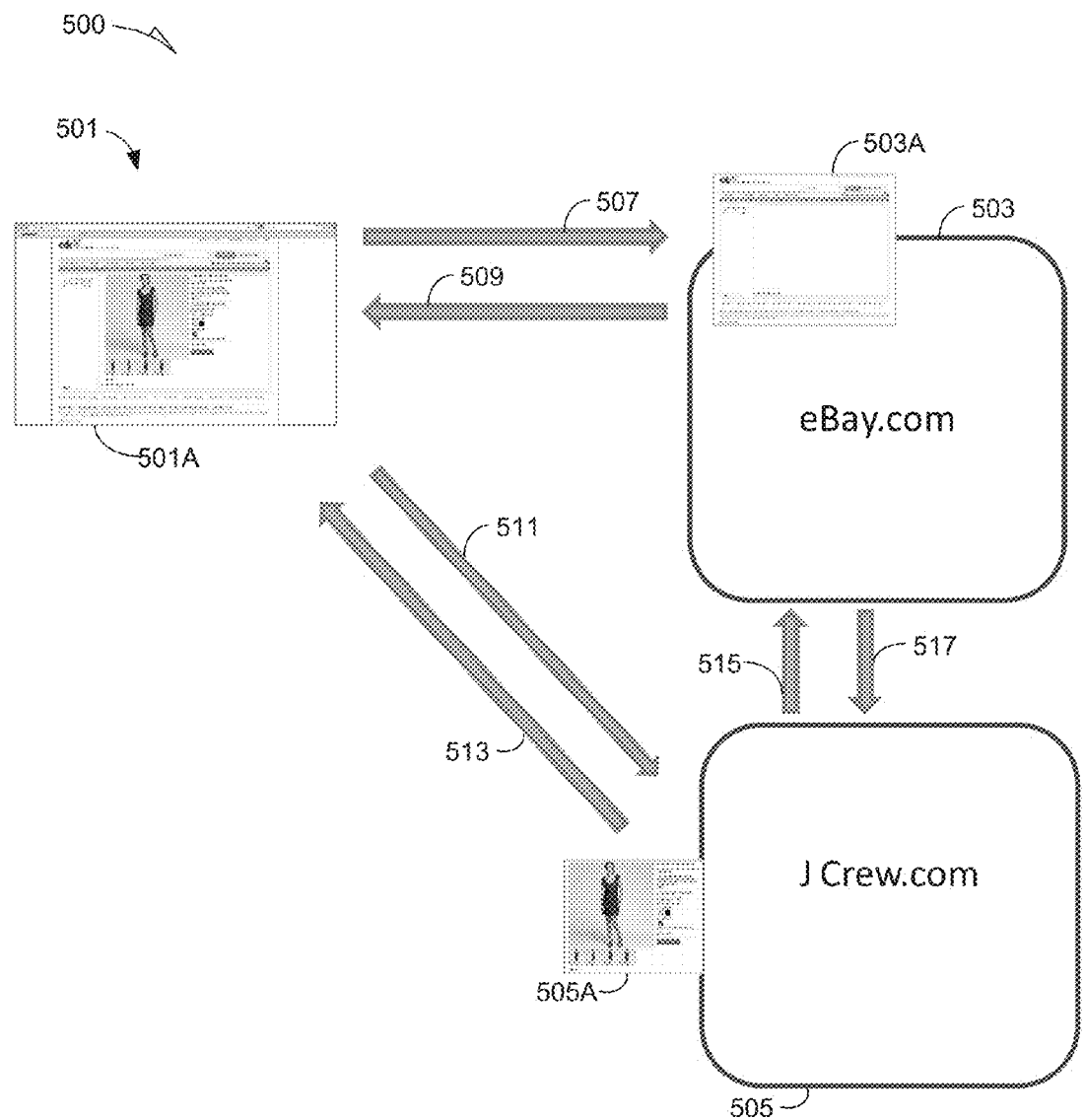
FIG. 5 is a block diagram illustrating data flow of an end-user accessing the commerce application established by the handshake of FIG. 4.

FIG. 5 is a block diagram 500 illustrating a data flow of an end-user accessing a commerce application established by communications provided through the handshake of FIG. 4. Using a browser 501, an end-user accesses a website of an electronic marketplace retailer 503 (e.g., eBay®) through a communications interface on a first server. The browser 501 may be on, for example, a computer, notepad, smart phone, or some other electronic communications device (not shown) of the end-user. In addition to being an electronic retailer, the electronic marketplace retailer 503 could also be one or more of various other types of electronic environments including, for example, wholesalers and customers having business-to-business (B2B) communications, social-networking sites having information exchanges between parties, intra-company websites having teleconferencing communications between various divisions, or a host of other electronic communications exchange mechanisms as would be understood by a skilled artisan. The electronic marketplace retailer 503 scenario is merely presented as an aid in understanding various aspects of the inventive subject matter.

Continuing the retail market scenario, once the end-user has established communications with the electronic marketplace retailer 503, the electronic marketplace retailer 503 can present one or more links (e.g., through a plurality of widgets) to the end-user. The end-user may click on one of the links that appears within the browser 501 to establish a handshake with a third-party retailer 505, such as such as J. CREW®. As noted above with reference to the electronic marketplace retailer 503, the third-party retailer 505 may also be one or more of various other types of electronic environments and, as such, the third-party retailer 505 may be operating on a second server. By clicking on the link, the end-user sends an initial request 507 for additional information through the browser 501 to the electronic marketplace retailer 503. Concurrently, by clicking on the link, the end-user is also sending a second request 511 for an Iframe (e.g., an interface frame) from the third-party retailer 505. In response to the initial request 507, the electronic marketplace retailer 503 sends a response 509 to the browser 501 of the end-user that includes, for example, an eBay® chrome 503A to surround an Iframe (discussed in more detail, below) sent from the third-party retailer 505. The Iframe will be merged into a canvas area of the chrome 503A (described, below). The chrome 503A is, for example, an outer electronic frame that allows various types of information to be contained therein in the form of an Iframe or other rendered information. The various information types appear to the end-user in a familiar form due to the chrome 503A. Additionally, applications can be placed within the Iframe.

Shortly after the end-user sends the initial request 507 and the second request 511, a handshake is established between the electronic marketplace retailer 503 and the third-party retailer 505 by an API call request 517 allowing communications between the electronic marketplace retailer 503 and the third-party retailer 505. During this time, the end-user continues to act within the site of the electronic marketplace retailer 503. In response to the API call request 517, the third-party retailer 505 sends an API response 515 to the electronic marketplace retailer 503. Substantially concurrent with the second request 511 and the handshake, the third-party retailer 505 further sends an Iframe 505A to the browser 501 of the end-user via an Iframe response 513.

Thus, in a specific exemplary embodiment of the end-user accessing the commerce application, the end-user is able to search for various products and perform a variety of activities on the J. CREW® site, but the end-user still remains on the eBay® site. For example, fitment information (e.g., male, over 40, size "L," etc.) pertaining to the end-user may be already contained on the electronic communications device of the end-user. Available J. CREW® inventory and merchandise that match the already-stored fitment information may be displayed to the end-user. Nonetheless, the end-user remains on the eBay® site. In this specific exemplary embodiment, the end-user may choose to buy a selected item immediately (e.g., using BIN). The selected item is added to the end-user's on-line shopping cart on the electronic marketplace retailer 503 along with any other item's the end-user purchased from J. CREW®, eBay®, or any other partner site (not shown but readily understood by a skilled artisan by applying the methodologies described herein). The end-user's information (e.g., already contained in a cookie on the electronic communications device of the end-user or stored by the first server) may be pre-populated with financial information, such as, the end-user's PayPal® or other type of payment account information, thus making payment for the item simple and convenient for the end-user.

The end-user can then select whether to have one or more of the purchased items shipped or, alternatively, certain ones of the already purchased items may be selected to be picked up at a local store. If the end-user chooses to pick up the items locally, a map can be displayed to guide the end-user to the location of the local store. Thus, in an exemplary embodiment, applications may show local stores based on an address of the end-user. As described above, the end-users address may be obtained either from the IP address of the electronic communications device of the end-user, a cookie received from, for example, eBay® and stored on the device of the end-user, or various other methodologies known independently in the art. Each of the applications can place items selected by the end-user directly into the shopping cart.

Figure 6A:
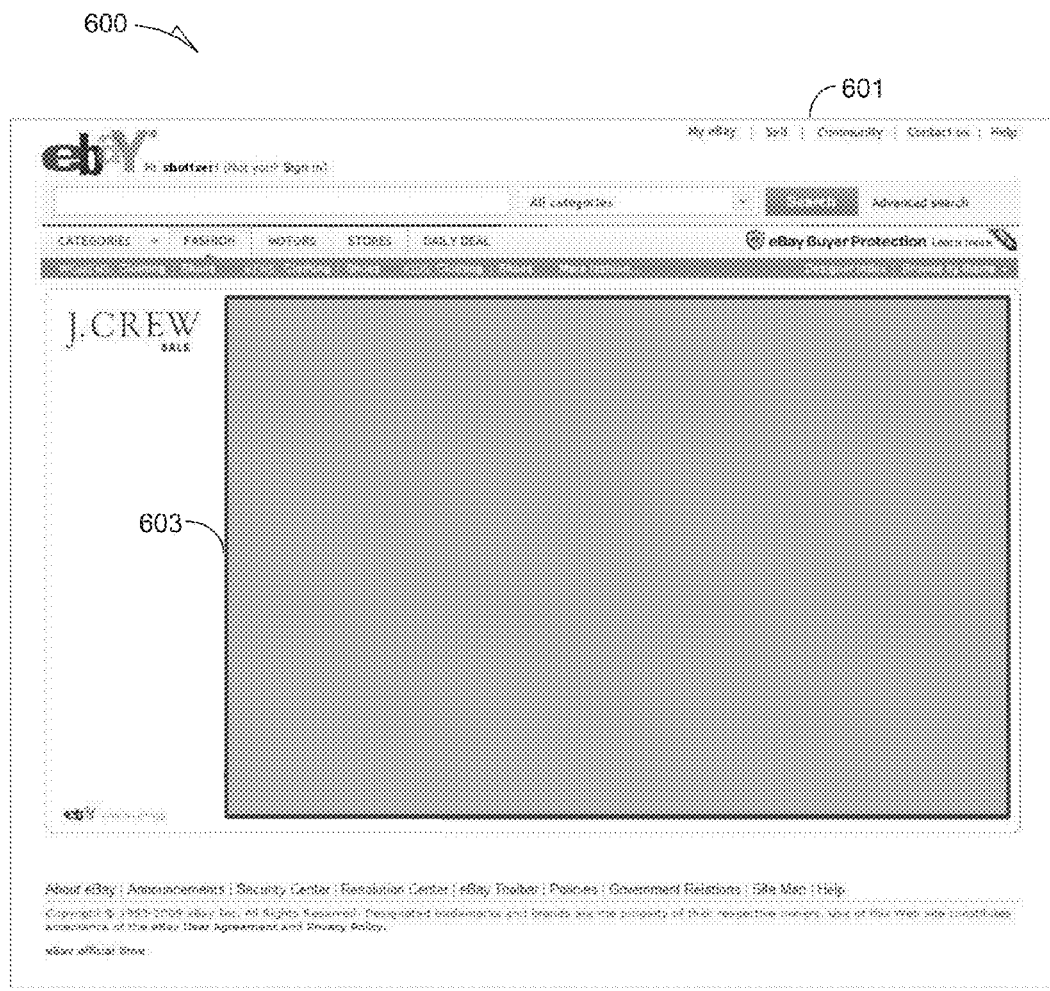
FIG. 6A is an exemplary embodiment of a chrome and canvas area accessible by a third-party retailer.
Figure 6B:
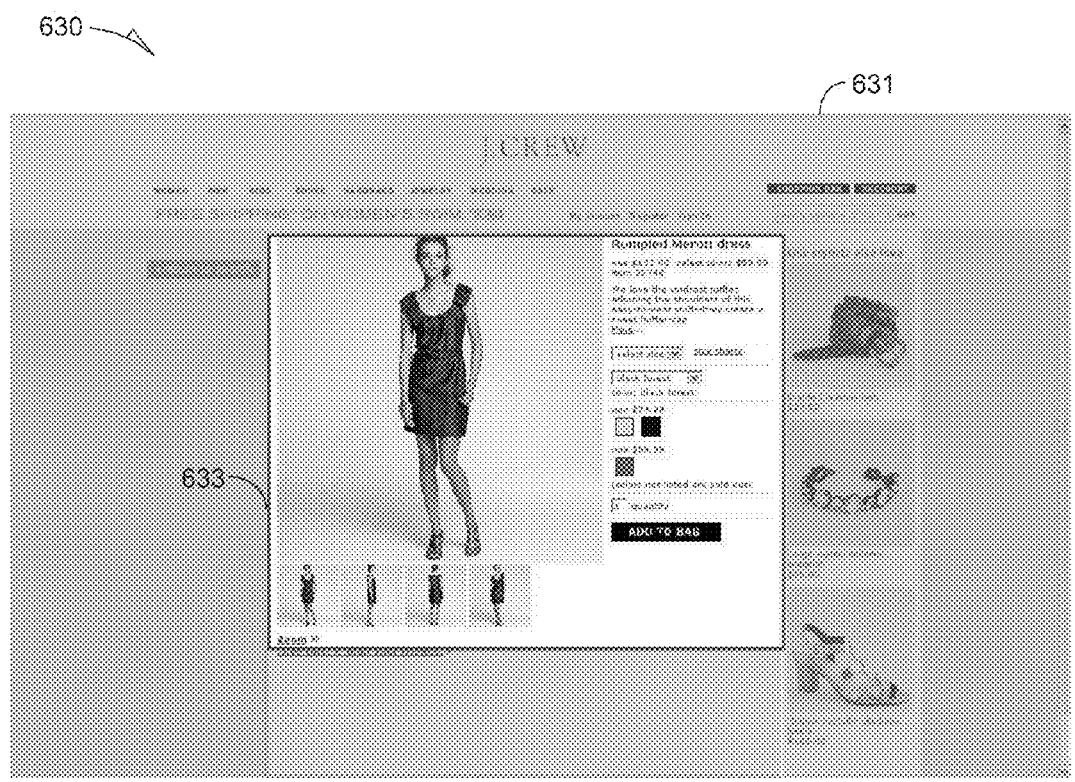
FIG. 6B is an exemplary web page of a third-party retailer.
Figure 6C:
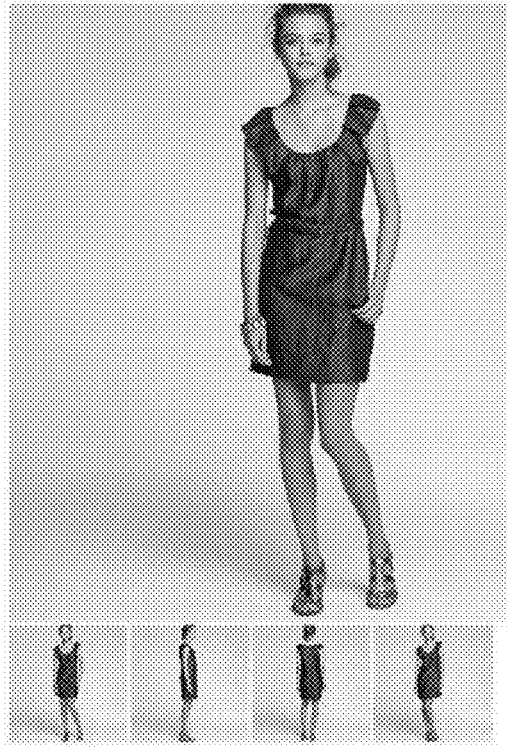
FIG. 6C is commerce application Iframe derived from the web page of FIG. 6B.

With reference now to FIG. 6A, an exemplary embodiment of a chrome and canvas area 600 accessible by an end-user is shown to include an outer chrome 601. The outer chrome 601, as generally described above with reference to FIG. 5, can be supplied by the electronic marketplace retailer 503. The outer chrome 601 area includes a canvas area 603 into which an Iframe may be placed. An exemplary webpage 630 of a third-party retailer is shown in FIG. 6B. The exemplary webpage 630 is shown to include a chrome 631 of the third-party retailer surrounding a subject matter area 633 that can be selectable as an Iframe. In FIG. 6C, the subject matter area 633 is selected as an Iframe 651. The Iframe 651 includes a description of the item depicted along with size and color selection choices. Additionally, a substantial amount of underlying information, such as metadata, can be included with the Iframe.

Figure 6D:
FIG. 6D is the chrome of FIG. 6A displaying the Iframe of FIG. 6C.

A compiled webpage 670 of FIG. 6D includes the outer chrome 601 (FIG. 6A), produced by the electronic marketplace retailer 503, along with information supplied in the form of the Iframe 651 (FIG. 6C), from the third-party retailer 505, placed into the canvas area 603 (FIG. 6A). The compiled webpage 670 is presented seamlessly on the browser of the end-user without the end-user leaving the webpage of the electronic marketplace retailer 503. In a specific exemplary embodiment, eBay® serves up a webpage to the end-user that has an eBay® chrome surrounding a large canvas. The third party electronic retailer, for example J. CREW®, can then place whatever material it wants into the Iframe and it will be rendered within the canvas area 603.

While various embodiments of the present invention are described with reference to assorted implementations and exploitations, it will be understood that these embodiments are illustrative only and that a scope of the present inventions is not limited merely to those described embodiments. Moreover, the systems and methods described herein may be implemented with facilities consistent with any hardware system or hardware systems either defined herein or known independently in the art using techniques described herein. Many variations, modifications, additions, and improvements are therefore possible.

Figure 7:
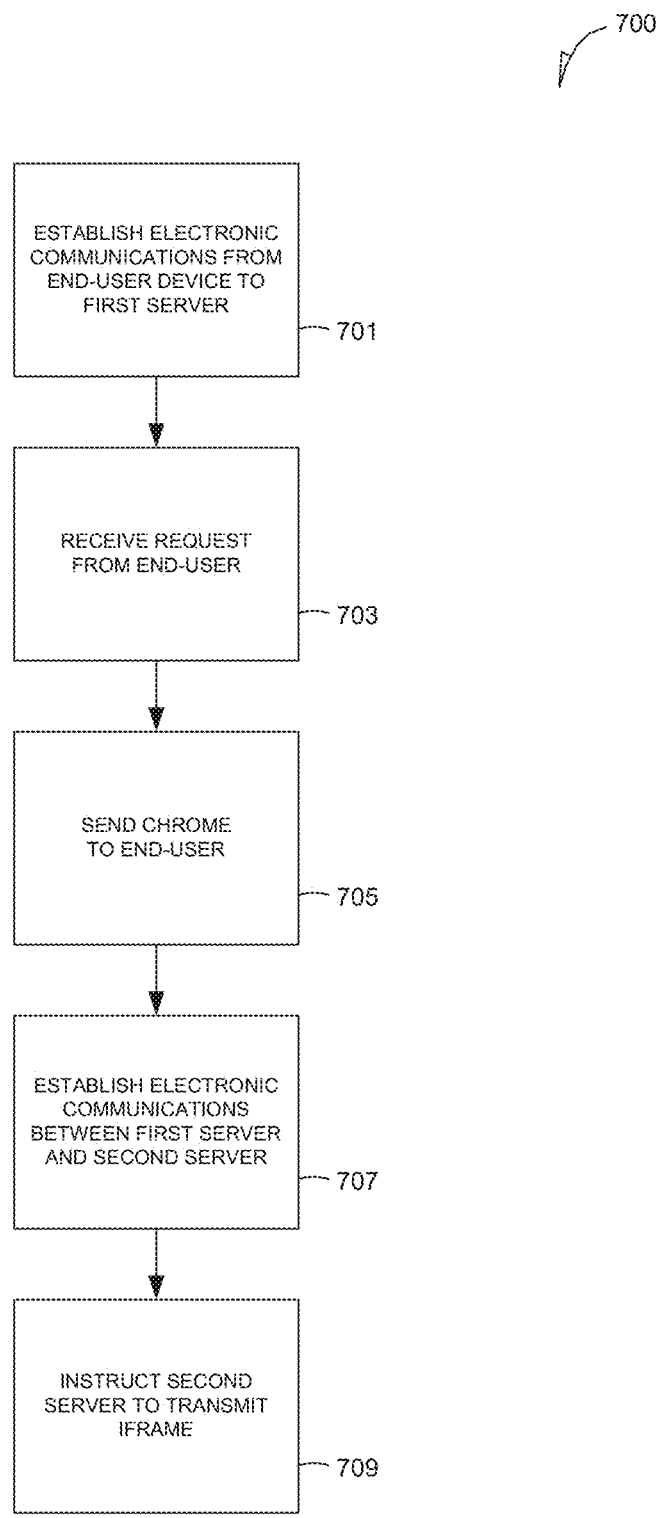
FIG. 7 is an exemplary embodiment of a method to present a commerce application to a device of an end-user.

With concurrent reference to FIGS. 4 and 5, FIG. 7 is an exemplary embodiment of a method 700 for presenting a commerce application to a device of an end-user. In a first operation 701, after an end-user accesses the website of the electronic marketplace retailer 503 through the browser 501 on a device of the end-user, electronic communications is established from the device of the end-user to a first server (e.g., a server of the electronic marketplace retailer 503). The first server receives a first request from the device of the end-user at operation 703. The first request allows electronic communications to be later established between the first server and a second server (e.g., the third-party retailer 505). In response to receiving the first request, the first server (1) sends a chrome to the device of the end-user, at operation 705, and establishes electronic communications between the first server and the second server, at operation 707. At operation 709, the first server further instructs the second server to transmit electronically an Iframe to the device of the end-user.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or one or more processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and
Machine-Readable Storage Medium

Figure 8:
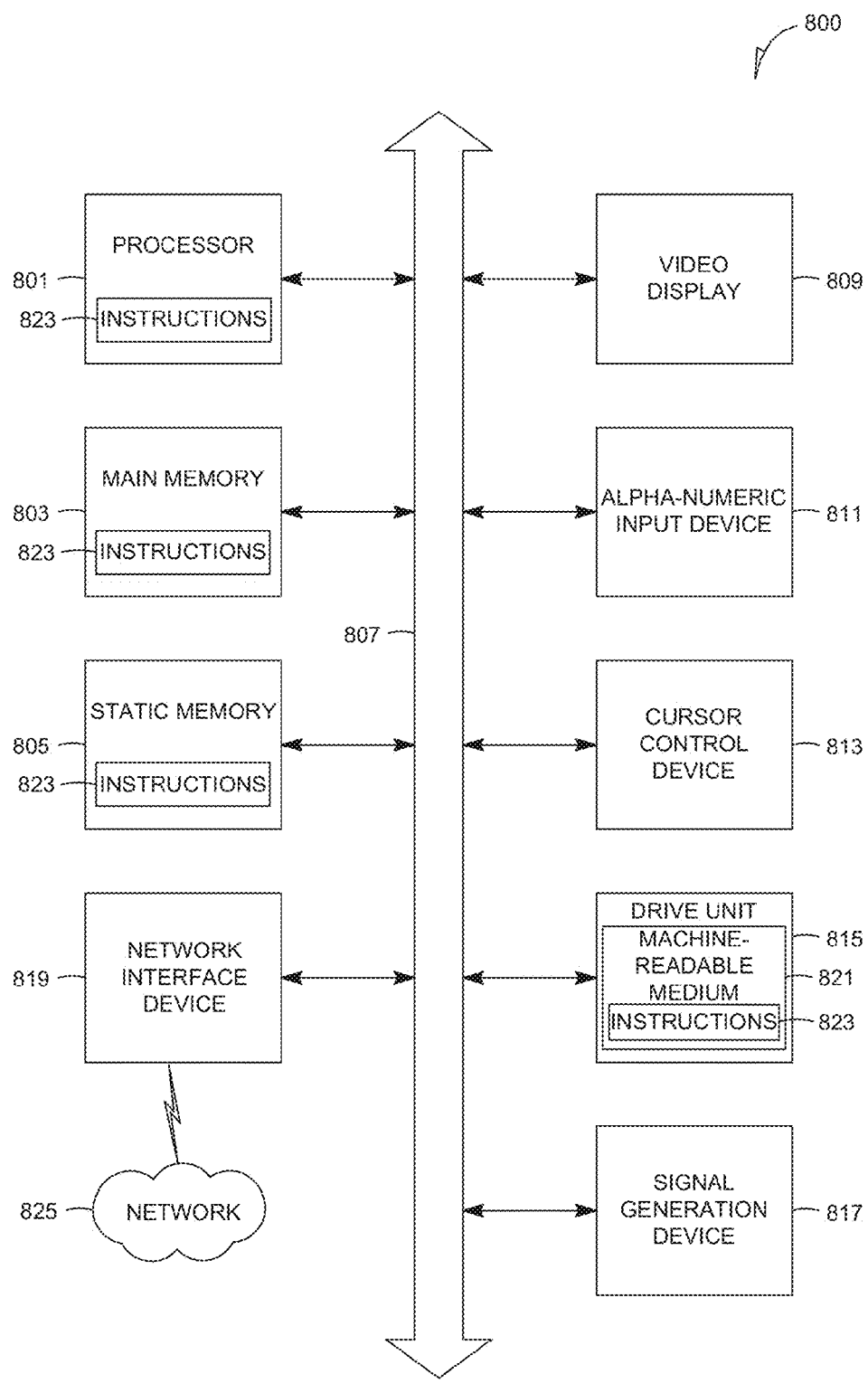
FIG. 8 is a simplified block diagram of a machine in an exemplary form of a computing system within which a set of instructions, for causing the machine to perform any one or more of the methodologies discussed herein, may be executed.

With reference to FIG. 8, an exemplary embodiment extends to a machine in the exemplary form of a computer system 800 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 includes a processor 801 (e.g., a central processing unit (CPU), a graphics processing unit (GPU) or both), a main memory 803 and a static memory 805, which communicate with each other via a bus 807. The computer system 800 may further include a video display unit 809 (e.g., a liquid crystal display (LCD) or a cathode ray tube (CRT)). The computer system 800 also includes an alphanumeric input device 811 (e.g., a keyboard), a user interface (UI) navigation device 813 (e.g., a mouse), a disk drive unit 815, a signal generation device 817 (e.g., a speaker), and a network interface device 819.

Machine-Readable Medium

The disk drive unit 815 includes a non-transitory machine-readable medium 821 on which is stored one or more sets of instructions and data structures (e.g., software 823) embodying or used by any one or more of the methodologies or functions described herein. The software 823 may also reside, completely or at least partially, within the main memory 803 or within the processor 801 during execution thereof by the computer system 800; the main memory 803 and the processor 801 also constituting machine-readable media.

While the non-transitory machine-readable medium 821 is shown in an exemplary embodiment to be a single medium, the term "machine-readable medium" may include a single medium or multiple media (e.g., a centralized or distributed database, or associated caches and servers) that store the one or more instructions. The term "non-transitory machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures used by or associated with such instructions. The term "non-transitory machine-readable medium" shall accordingly be taken to include, but not be limited to, solid-state memories, and optical and magnetic media. Specific examples of machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software 823 may further be transmitted or received over a communications network 825 using a transmission medium via the network interface device 819 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of the present invention is represented by the appended claims. The specification and drawings are, accordingly, to be regarded in an illustrative rather than a restrictive sense.

What is claimed is:

1. A system to present an application to a device of an end-user, the system comprising:
   one or more hardware processors; and
   memory including instructions that, when executed by the one or more hardware processors, cause the system to:
   establish a payment account for the end-user at a first server;
   transmit electronically an element from the first server to the device of the end-user;
   receive a first request for information by the first server from the device of the end-user;
   in response to the device of the end-user accessing the element, establish electronic communications between the first server and a second server via the first server transmitting an application programming interface (API) call request to the second server and receiving an API response from the second server, transmit a graphical-interface feature from the first server to the device of the end-user, and instruct the second server to transmit content electronically to the first server to be displayed on the device of the end-user;
   prepare by the first server the content received from the second server to be placed within the graphical-interface feature of the device of the end-user to be transmitted by the first server to be displayed on the device of the end-user and within the graphical-interface feature;
   transmit a combination of the content and the graphical-interface feature from the first server to the device of the end-user;
   receive a second request by the first server from the device of the end-user to complete a transaction including an item of the second server; and
   transmit information of the payment account for the end-user from the first server to the device of the end-user to pre-populate a payment interface displayed within the graphical-interface feature.

2. The system of claim 1, wherein the graphical-interface feature is a chrome.

3. The system of claim 1, wherein the graphical-interface feature is a frame having a canvas area into which the content is to be placed.

4. The system of claim 1, wherein the content includes an Iframe.

5. The system of claim 1, wherein the content includes at least one object selected from a graphical object and a textual object.

6. The system of claim 1, wherein the content is to be displayed on the device of the end-user without the device of the end-user leaving a webpage of the first server or connecting to the second server.

7. A method of presenting an application to a device of an end-user, the method comprising:
   establishing a payment account for the end-user at a first server;
   transmitting electronically an element from the first server to the device of the end-user;
   receiving a first request for information by the first server from the device of the end-user;
   in response to the device of the end-user accessing the element, establishing electronic communications between the first server and a second server via the first server transmitting an application programming interface (API) call request to the second server and receiving an API response from the second server, transmitting a graphical-interface feature from the first server to the device of the end-user, and instructing the second server to transmit content electronically to the first server to be displayed on the device of the end-user;
   preparing by the first server the content received from the second server to be placed within the graphical-interface feature to be transmitted by the first server to be displayed on the device of the end-user and within the graphical-interface feature;
   transmitting a combination of the content and the graphical-interface feature from the first server to the device of the end-user;
   receiving a second request by the first server from the device of the end-user to complete a transaction including an item of the second server; and
   transmitting information of the payment account from the first server to the device of the end-user to pre-populate a payment interface displayed within the graphical-interface feature.

8. The method of claim 7, further comprising:
   causing both the content and the graphical-interface feature to be displayed substantially concurrently on the device of the end-user.

9. The method of claim 7, further comprising receiving metadata by the first server from the second server along with the content.

10. The method of claim 7, further comprising transmitting personal data associated with the end-user from the first server to the second server.

11. The method of claim 7, further comprising maintaining the electronic communications between the device of the end-user and the first server throughout the second server electronically transmitting the content.

12. The method of claim 7, wherein the graphical-interface feature is a chrome.

13. The method of claim 7, wherein the graphical-interface feature is a frame having a canvas area into which the content is to be placed.

14. The method of claim 7, wherein the content includes an Iframe.

15. The method of claim 7, wherein the content includes at least one object selected from a graphical object and a textual object.

16. The method of claim 7, wherein the content is to be displayed on the device of the end-user without the device of the end-user leaving a webpage of the first server or connecting to the second server.

17. A non-transitory computer-readable storage medium including instructions that, when executed by one or more processors, cause the one or more processors to perform operations comprising:

establishing a payment account for an end-user at a first server;

transmitting electronically an element from the first server to a device of the end-user;

receiving a first request for information by the first server from the device of the end-user;

in response to the device of the end-user accessing the element, establishing electronic communications between the first server and a second server via the first server transmitting an application programming interface (API) call request to the second server and receiving an API response from the second server, transmitting a graphical-interface feature from the first server to the device of the end-user, and instructing the second server to transmit content electronically to the first server to be displayed on the device of the end-user;

preparing by the first server the content received from the second server to be placed within the graphical-interface feature to be transmitted by the first server to be displayed on the device of the end-user and within the graphical-interface feature;

transmitting a combination of the content and the graphical-interface feature from the first server to the device of the end-user;

receiving a second request by the first server from the device of the end-user to complete a transaction including an item of the second server; and transmitting information of the payment account from the first server to the device of the end-user to pre-populate a payment interface displayed within the graphical-interface feature.

18. The non-transitory computer-readable storage medium of claim 17, wherein the operations further comprise:

causing both the content and the graphical-interface feature to be displayed substantially concurrently on the device of the end-user.

19. The non-transitory computer-readable storage medium of claim 17, wherein the content is to be displayed on the device of the end-user without the device of the end-user leaving a webpage of the first server or connecting to the second server.

20. The non-transitory computer-readable storage medium of claim 17, wherein the operations further comprise transmitting personal data associated with the end-user from the first server to the second server.

* * * * *